United States Patent [19]

Martin et al.

[11] 4,069,457
[45] Jan. 17, 1978

[54] HIGH-ENERGY ACCELERATOR FOR BEAMS OF HEAVY IONS

[75] Inventors: Ronald L. Martin, La Grange; Richard C. Arnold, Chicago, both of Ill.

[73] Assignee: The United States of America as represented by the United States Department of Energy, Washington, D.C.

[21] Appl. No.: 769,822

[22] Filed: Feb. 17, 1977

[51] Int. Cl.$^2$ .................. G21B 1/00; H05H 13/04
[52] U.S. Cl. ............................ 328/235; 176/1; 313/359; 176/5
[58] Field of Search .............. 328/235, 233; 176/1, 176/2, 5; 313/359

[56] References Cited

U.S. PATENT DOCUMENTS

| 3,139,591 | 6/1964 | Rheaume et al. ............. 328/235 X |
| 3,303,426 | 2/1967 | Beth ........................... 328/235 |
| 3,328,708 | 6/1967 | Smith et al. .................. 328/235 |

OTHER PUBLICATIONS

"Sor-Ring: An Electron Storage Ring Dedicated to Spectroscopy," by Miyahara et al, Particle Accelerators, vol. 7, No. 3, pp. 163-175, 1976.

*Primary Examiner*—Palmer C. Demeo
*Attorney, Agent, or Firm*—Dean E. Carlson; Frank H. Jackson; Donald P. Reynolds

[57] ABSTRACT

An apparatus for accelerating heavy ions to high energies and directing the accelerated ions at a target comprises a source of singly ionized heavy ions of an element or compound of greater than 100 atomic mass units, means for accelerating the heavy ions, a storage ring for accumulating the accelerated heavy ions and switching means for switching the heavy ions from the storage ring to strike a target substantially simultaneously from a plurality of directions. In a particular embodiment the heavy ion that is accelerated is singly ionized hydrogen iodide. After acceleration, if the beam is of molecular ions, the ions are dissociated to leave an accelerated singly ionized atomic ion in a beam. Extraction of the beam may be accomplished by stripping all the electrons from the atomic ion to switch the beam from the storage ring by bending it in magnetic field of the storage ring.

11 Claims, 9 Drawing Figures

Fig-3
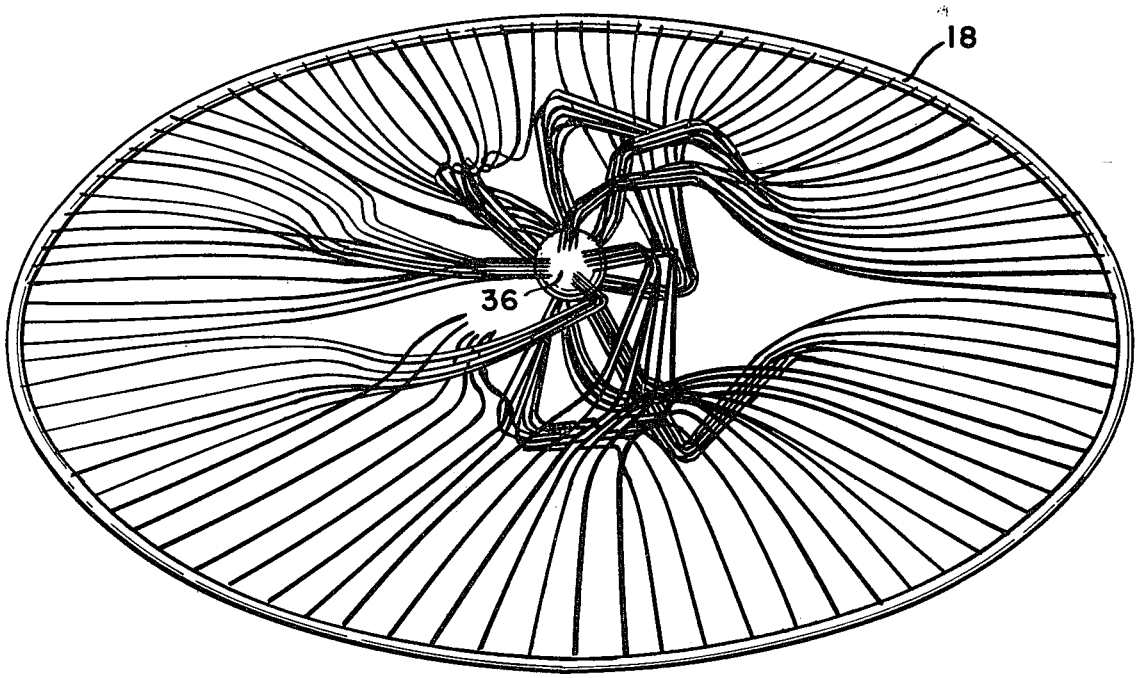
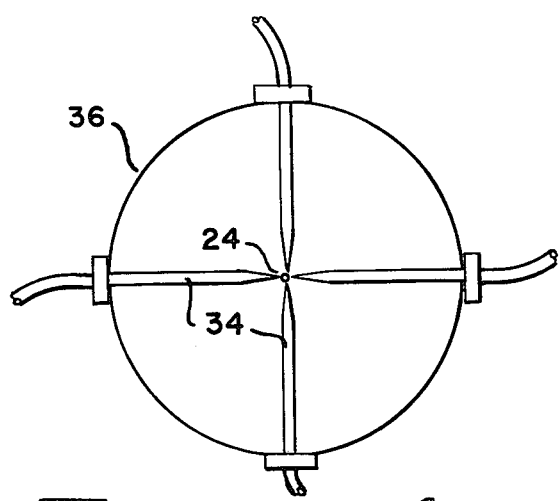
Fig-4

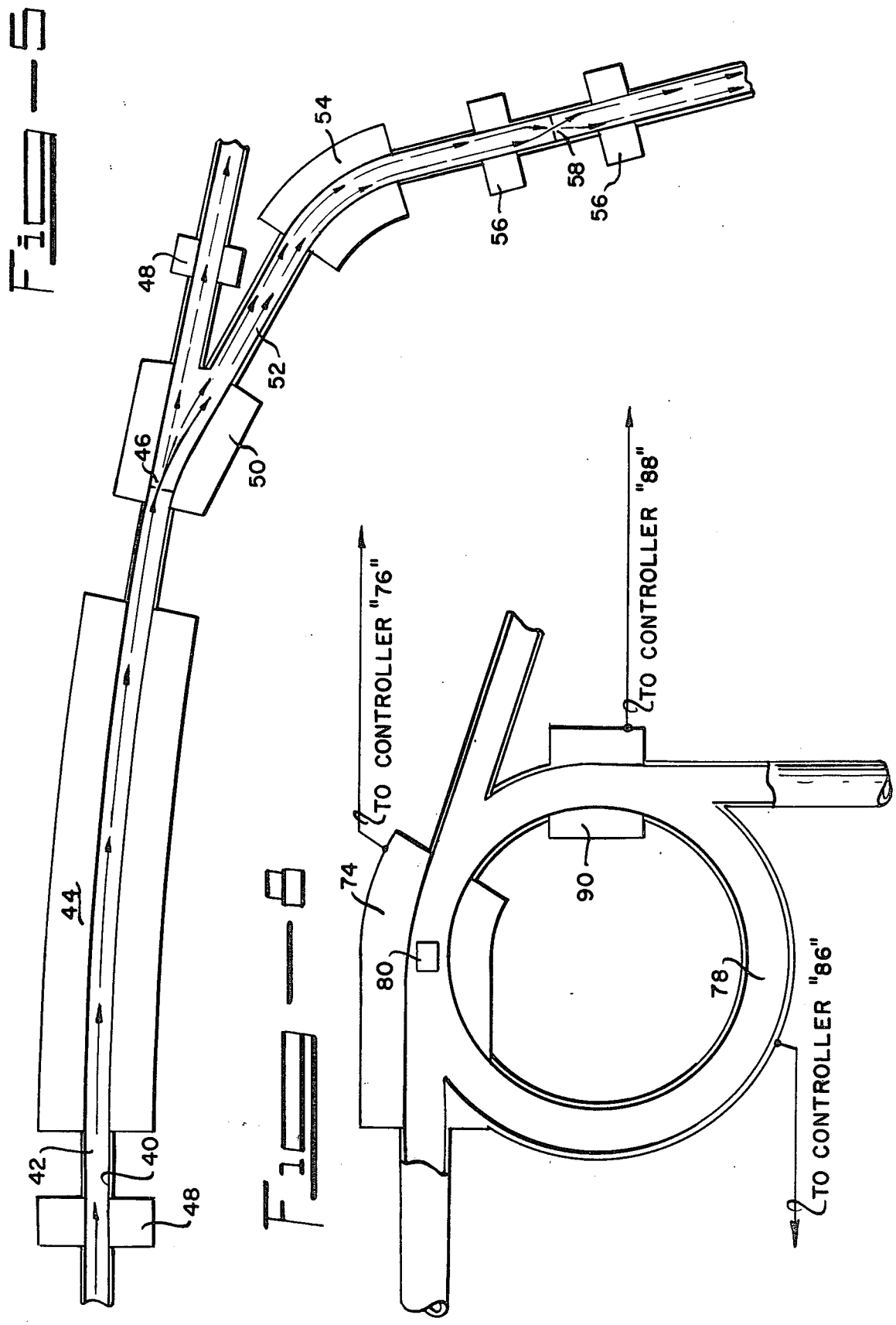

HIGH-ENERGY ACCELERATOR FOR BEAMS OF HEAVY IONS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method and means of delivering relatively large amounts of power to a beam of particles.

An essential element of efforts to achieve controlled thermonuclear fusion is a method and means of delivering enough energy and power to a pellet of fusionable material to initiate a fusion reaction. One system that is presently under consideration in some areas involves the development and use of lasers of extremely high power to generate beams of light that can be focused on a pellet of fusionable material. Another approach that is being studied is to generate beams of electrons of relativistic energies and direct these beams at pellets. Such mechanisms of energy transfer have been added to the earlier attempts to pinch or otherwise compress or confine a plasma to achieve the necessary combinations of temperature, density, and duration to achieve thermonuclear fusion.

To date, however, there has been little serious consideration of accelerators of particles other than electrons as means for delivering energy to fusionable pellets. The reasons for this lack of consideration lie in the limitations that have been associated with the different types of particle accelerators. Electron accelerators have not been able to produce energies and densities that are within orders of magnitude of those necessary to cause fusion. Proton accelerators have the possibility of accomplishing more energy transfer than electron accelerators because of the considerably greater mass of the protons, but existing proton accelerators are also not close to being able to produce satisfactory combinations of particle density and energy and to deliver the combinations to pellets in times that are adequate to initiate fusion. Heavy-ion accelerators have the advantage that for a given velocity they have more energy available for transfer to a small target, in contrast to accelerated electrons, which can pass through a small target without transferring all their energy. However, no existing accelerator of heavy ions has achieved either energies or densities in ranges that are sufficiently high to be promising. The proposals made to date that involve accelerators of heavy ions to ignite fusionable pellets have all been speculative in that they required sources that did not exist and techniques of acceleration, transport, and focus that have not been demonstrated, and in addition used highly charged ions. Moreover, the requirement for fusion is an extremely high power or, in other words, a high value of energy per unit time that is transferred to a target particle. Neither linear accelerators nor racetrack circular accelerators seem even close to being capable of producing single beams in a range of energy and particle density that will induce fusion.

It may be appreciated that synchrotron accelerators now in existence are capable of accelerating particles to high energies and in substantial numbers. However, existing accelerators that can store particles at energies of tens of GeV are all proton accelerators. This ion energy is the minimum amount necessary to trigger controlled fusion, but it is not useful when supplied by protons because the range is too long. This means that too many protons at this energy would pass right through a target of usable size for a controlled thermonuclear reaction without interacting with molecules in the target to transfer energy. Heavy ions have a more useful range, but existing accelerators of heavy ions at adequate levels of energy produce too few ions by 5 to 7 orders of magnitude. In addition, no present accelerator of heavy ions can accelerate singly charged heavy ions to high energies.

When a synchrotron accelerator has been operated to accelerate particles, the accelerated particles are typically spread in a beam of bunches about the circumference of a ring. Extraction may then be effected by either of two schemes. First, the beam may be bumped so that a relatively small number of particles is removed from each successive bunch for a number of turns of the beam about the ring. This is called a slow spill. Alternatively, the entire beam may be extracted from the ring at a location and directed toward a target. In general, this alternative produces higher incident densities from a given accelerator, but the extraction time is equal to the time needed for one accelerated bunch to make one passage around the ring. This time is typically of the order of microseconds, and in several orders of magnitude longer than the maximum time that will be needed to transfer energy to initiate controlled thermonuclear fusion.

It is an object of the present invention to provide an apparatus for accelerating charged particles and delivering them to a target in a range of energies and densities that will be capable of causing thermonuclear fusion of a pellet.

Other objects will become apparent in the course of a detailed description of the invention.

SUMMARY OF THE INVENTION

An apparatus for accelerating heavy ions to high energies and delivering them in high densities and short times to a target includes a source of singly ionized heavy ions, an accelerator receiving and accelerating the singly ionized heavy ions, a storage ring receiving, accumulating, and circulating bunches of accelerated singly ionized heavy ions, means for dissociating the heavy ions to singly ionized ions of single atoms, and means for stripping the singly ionized atoms to completely ionized atoms and switching the completely ionized atoms into a plurality of beams that impinge upon the target. In various embodiments of the invention a sychrotron is interposed to accelerate particles and a plurality of storage rings is used to store particles or to accelerate and store particles.

BRIEF DESCRIPTION OF THE DRAWINGS

FIG. 3 is a sketch of an embodiment of a storage ring and an array of beam lines that impinge upon a target.

FIG. 4 is a symbolic sketch of an alternate embodiment of a storage ring and a set of beam lines impinging upon a target.

FIG. 5 is a sketch of a unit section of the storage rings of FIGS. 3 and 4.

FIG. 6 is an expanded view of the extraction section of FIG. 5.

FIG. 8 is an expanded view of one of the rings of FIG. 7.

DETAILED DESCRIPTION OF THE INVENTION

Figure 1:
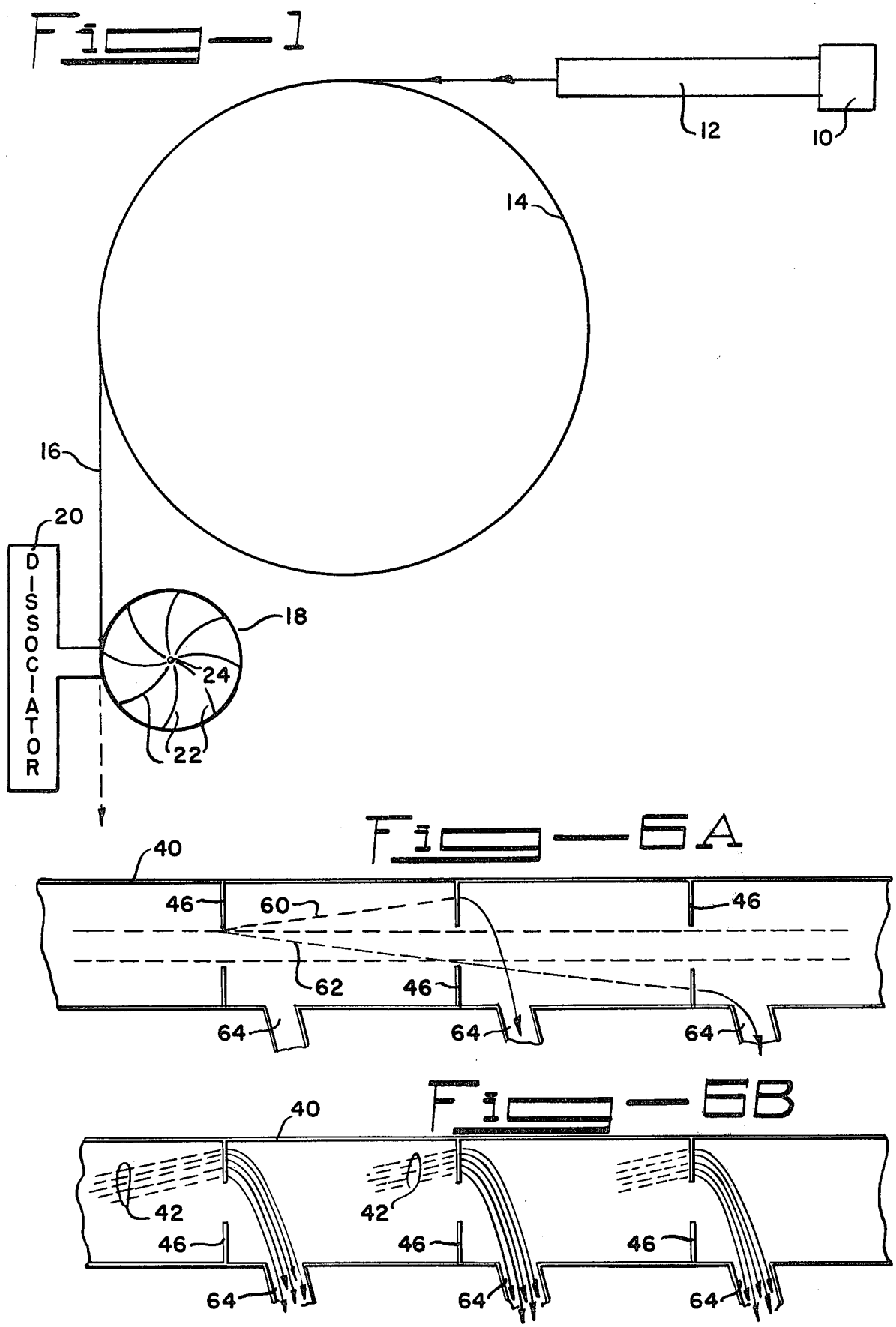
FIG. 1 is a diagrammatic sketch of an embodiment of the accelerator of the present invention.

FIG. 1 is a schematic diagram of an accelerator for the practice of the present invention. In FIG. 1, ion source 10 generates ions for injection into linear accelerator 12. The ions that are produced by ion source 10 should have a mass greater than 100 atomic mass units and should be capable of ready ionization to a unique state of ionization. That is to say, it should be possible to achieve a large percentage of ions that have the same charge. These ions are then accelerated in linear accelerator 12 and are injected into synchrotron 14 where they are accelerated to a high energy, of the order of 8 GeV or higher. Linear accelerator 12 may include a pre-accelerator such as a Cockroft-Walton accelerator. Accelerated ions are extracted from synchrotron 14, either immediately or following some storage, and are transported by beam line 16 to storage ring 18. If the ions are of compounds rather than of atoms, they must be subjected to the effects of dissociator 20. a system for dissociating the compound into a uniquely ionized ion of a relatively heavy element such as iodine and the unionized atom such as hydrogen with which it was formerly bound as a compound. Such atoms of compounds are here referred to as molecular ions, while ions of individual atoms are here referred to as atomic ions. The term "uniquely ionized" is defined to mean ionized to a particular predetermined level of ionization. The uniquely ionized ion of the heavy element is then stored in circulation in storage ring 18 which is thus loaded by a plurality of pulses of ions that have been accelerated in synchrotron 14. While one synchrotron 14 is shown here, it may also be desirable to use a plurality of accelerators 14, a plurality of storage rings 18, or both. It is thus possible to achieve in storage ring 18 a circulating beam having a total number of particles that is many times the number that can be accelerated in one cycle by synchrotron 14.

At a given time and following a given scheme, the ions that are circulating in storage ring 18 are switched into a plurality of beams 22 that are aimed at a target 24, typically a pellet of fusionable material. The plurality of beams 22 is directed to illuminate target 24 over a substantial part of its surface from a plurality of directions at essentially the same time. By means of the combination of the synchrotron 14, storage ring 18 and plurality of beams 22, it is possible to achieve incidence on target 24 of a plurality of beams having the energy of synchrotron 14 but a particle density that is much in excess of the particle density that can be produced in a single beam from synchrotron 14. The process by which a plurality of particle beams 22 is directed simultaneously at target 24 is indicated schematically in FIG. 1. Succeeding figures will indicate various embodiments for achieving the same end.

Figure 2:
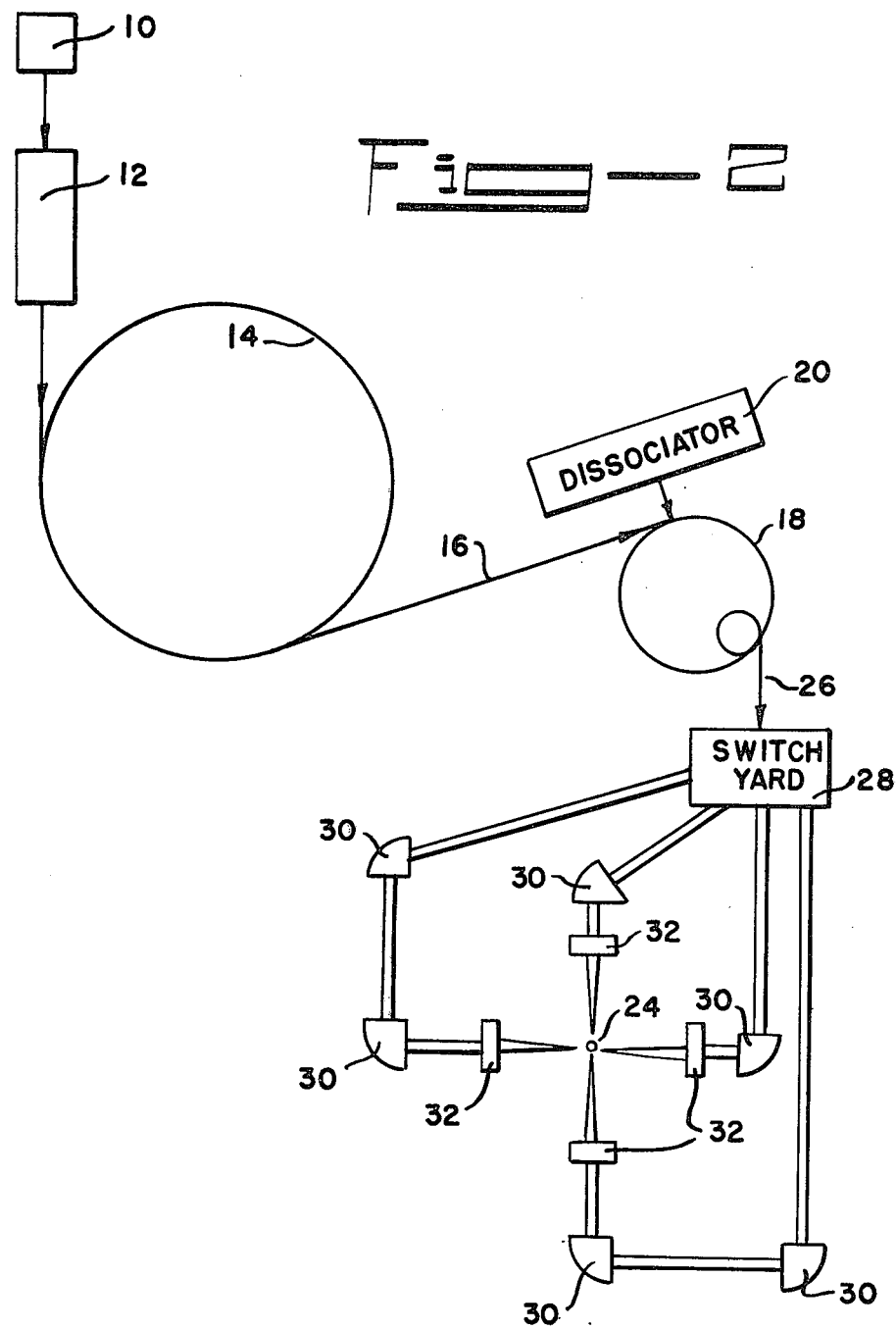
FIG. 2 is a diagrammatic sketch of a first alternate embodiment of the accelerator of the present invention.

FIG. 2 is an alternate embodiment of the accelerator of the present invention. In FIG. 2, an ion source 10 generates ions that are coupled to linear accelerator 12, accelerated, and injected into synchrotron 14. As before, linear accelerator 12 may include a pre-accelerator if necessary. Accelerated ions are conducted through beam line 16 to storage ring 18. As in FIG. 1, a dissociator 20 may be used if the heavy ions are molecular ions that are to be dissociated into atomic ions. As before, storage ring 18 accumulates accelerated particles during a plurality of cycles of synchrotron 14 or from more than one synchrotron 14. At a predetermined time, the beam in storage ring 18 is deflected from storage ring 18 into beam 26 in a time during which the ions circulate once around storage ring 18. In the embodiment shown, the transfer from storage ring 18 to beam 26 is accomplished by stripping the ions circulating in storage ring 18 of their electrons so that they bend in a much smaller radius than in the singly charged state in which they were stored. Other means of accomplishing this transfer without change of charge are well known. Beam 26 then enters switch yard 28, an array of switching magnets that is calculated to select from a plurality of available directions that sequence of directions that will cause target 24 to be struck by a plurality of beams at the same time. To accomplish this, a plurality of bending magnets 30 is disposed to create a different path length for each beam so that whatever beam is switched first in switch yard 28 will follow the longest path. Later beams are switched into progressively shorter paths so that when all the beams are focused upon target 24 by lenses 32 the target will be struck simultaneously from a plurality of directions. FIG. 2 illustrates four beams incident upon target 24, but this number is selected for illustration only. The number of beams chosen is a readily calculable function of the size of target 24, the amount of focus obtainable with lenses 32, the desired number of directions of incidence upon target 24, and the desired density of energy incident upon target 24.

FIG. is an alternate embodiment of an apparatus for taking beams from a storage ring and causing the beams to be incident essentially simultaneously on a target from many directions. In FIG. 3, storage ring 18 contains a circulating beam of heavy ions that has been loaded in the manner illustrated in FIGS. 1 and 2. In FIG. 3, storage ring 18 is connected to a plurality of beam lines 34 that carry switch beams substantially radially inward toward a target located in chamber 36. This plurality should equal a submultiple of the number of bunches of charged particles that circulates in storage ring 18. The beam lines 34 proceed for some distance in the plane of storage ring 18 but are bent in various directions as they approach chamber 36. The objective of the bending is twofold: first, to illuminate the interior of chamber 36 substantially equally from a plurality of directions and second, to create paths of equal length so that bunches switched simultaneously from storage ring 18 arrive simultaneously at chamber 36 to couple to and heat a target therein. The number of beam lines 34 is a design choice based upon the number of bunches in the beams, the dimensions of storage ring 18 and the space that is necessary to accomplish switching from storage ring 19 into the beam lines 34. Such switching takes a certain amount of space, as will later be made apparent. A nominal figure for the numer of beam lines 34 is 100.

FIG. 4 shows an idealized version of the conditions inside chamber 36 of FIG. 3. A target 24 is located at the center of chamber 36 and a plurality of beam lines 34 is seen to enter chamber 36 to approach target 24. As before, target 24 may be a pellet of fusionable material. Each beam line 34 is focused by a lens 38 which is typically a quadrupole focusing magnet, although electrostatic lenses or a combination of electrostatic and magnetic lenses would also suffice. The objective is to achieve a very high energy density incident on pellet 24 in a very short time and the lenses 38 permit an increase in beam density while minimizing the resulting defocusing tendency during most of the length of beam lines 34. FIG. 4 indicates the entry of four beam lines 34 directed at the pellet 24 and the four beam lines are seen in this view to be coplanar. This is a simplification for purposes of illustration. As actually constructed, chamber 36 will receive approximately 100 beam lines 34 that are so directed as to illuminate pellet 24 substantially uniformly over its entire surface. Figure of 100 beam lines is an arbitrary one that is of the correct order of magnitude for supplying particles in the necessary range of densities and in a sufficient number of directions to provide uniform illumination of a pellet 24.

FIG. 5 is a view of a unit section of the storage rings of FIGS. 3 and 4. In FIG. 5, vacuum chamber 40 is directed in a ring pattern to contain a circulating beam 42 of singly charged atoms of a substance such as iodine. Bending and focusing magnet 44 provides a static magnetic field directed to contain circulating accelerated atoms in beam 42 by focusing the beam and by bending the beam as necessary. Magnet 44 may be superconducting or normal and is designed to keep beam 42 in a desired location while beam 42 circulates about a storage ring. Magnet 44 will typically be a combination of one or more dipole magnets and one or more quadrupole magnets with the dipole magnets primarily bending the beam and the quadrupole magnets primarily for focusing. The equilibrium path of beam 42 is directed to miss foil 46 which extends across a portion of the interior of vacuum chamber 40. Extraction of the beam from vacuum chamber 40 is initiated by applying a pulse to kicker magnet 48, a rapidly acting dipole magnet typically having a ferrite core. Kicker magnet 48 causes an inward kick of beam 42 which causes beam 42 to strike foil 46, stripping electrons from the singly charged ions in beam 42. Foil 48 may be made of metal, with titanium being a particularly effective choice, or of an organic polymer. Extraction steering magnet 50 causes a sharp bend in the path of stripped ions in contrast to the relatively slight deviation that it introduces in the path of those ions that do not strike the foil. Fully stripped ions are bent by extraction steering magnet 50 into beam line 52. They are subjected to further bending by bending magnet 54 and focusing magnet 56, each of which represents one or more magnets, as many as is necessary to accomplish the desired amount of bending and focusing. It is possible, though not necessary, to combine with focusing magnet 56 a vacuum retention means 58. This may be either an orifice or a foil that permits passage of the beam while retaining all or almost all of the system vacuum for isolation and pumping efficiency.

FIG. 6 is an expanded view of a portion of a plurality of the unit sections of FIG. 5. FIG. 6 is shown without the presence of bending magnets and kicker magnets and is indicated schematically in a straight line for clarity. FIG. 6 is also shown in two views to indicate the functions of the extraction sections of both extracting the beam and of diverting unwanted particles during circulation. In FIG. 6, vacuum chamber 40 contains a beam 42 of singly ionized atoms of an element such as iodine. FIG. 6A shows the beam 42 during filling and circulation. Foils 46 are thin annular sheets of metal or an organic material disposed to miss the circulating beam of singly ionized ions. During filling and circulation beam 42 may experience some degradation as a result of collision of pairs of singly ionized ions to produce double ionized ions and neutral atoms. Such particles will follow the paths indicated as 60 and 62 in FIG. 6A. When these unwanted particles strike the next foils 46 that are in their paths, they will be stripped of all their electrons leaving completely ionized ions which are then deflected as shown into the extraction ports 64 from which they are removed from circulation.

Switching to extract beams from the storage ring is indicated in FIG. 6B, in which the beam 42 has been pumped by a kicker magnet. The bumped beam 42 is deflected outward on a path that causes it to strike foil 46. Collision with foil 46 strips all the electrons from the circulating beam, causing it to be deflected into the next sequential extraction port 64. All kicker magnets are energized at essentially the same time to start extraction simultaneously at each deflection port. This allows dumping of the entire beam in a time equal to the transit time between two adjacent extraction ports 64, in contrast to the shortest extraction time in a normal accelerator, which is the time for one bunch to traverse the entire ring. It can thus be seen that the extraction time is divided by the number of extraction ports, and the particle density per unit time incident on a target is correspondingly increased.

Figure 7:
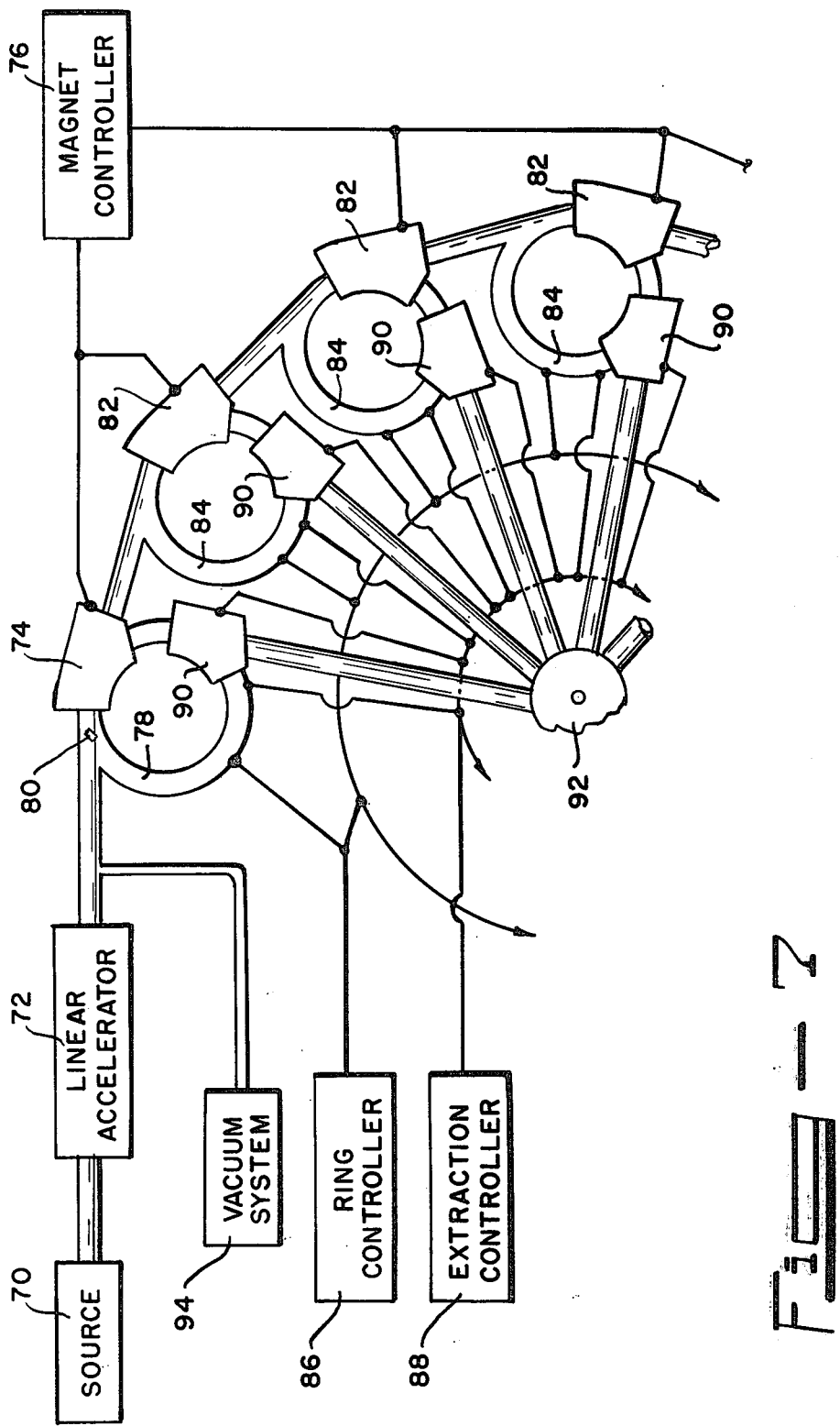
FIG. 7 is a sketch of a second alternate embodiment of the accelerator.

FIGS. 7 and 8 show an alternate embodiment of the invention. FIG. 7 is a diagram of an accelerator with multiple rings and FIG. 8 is an expanded view of a single ring of FIG. 7. In FIGS. 7 and 8, source 70 supplies singly ionized heavy ions to a linear accelerator 72. The criteria for selection of the ions is that they should have a relatively high mass and an ionization state that is sufficiently separated from adjacent ionization states to make it relatively easy to ionize a large percentage of ions to that unique state. Linear acceleration 72 receives and accelerates ions in the unique state. As before, those ions may be molecular or atomic ions. If they are molecular, such as singly ionized hydrogen iodide, it will be desirable to dissociate them to leave singly ionized ions of a relatively heavy element such as, in this case, iodine. Such dissociation will not be necessary if the ions are atomic such as, for example, singly ionized uranium. If dissociation is necessary, it will be carried out in connection with first bumping magnet 74. First bumping magnet 74 is operated under the control of magnet controller 76 to carry out several functions. The first such function is to load ring 78 with uniquely ionized heavy ions. If the original input from source 70 was an atomic ion, then no dissociation is necessary and first bumping magnet 74 need only shift the beam of incoming accelerated ions sufficiently to direct the beam into ring 78. If the incoming beam is of molecular ions, then first bumping magnet 74 must shift the incoming beam to a dissociator 80. This is a region in which the accelerated particles encounter a dissociating means such as a laser beam or a strong electric field that is sufficient to dissociate the molecular beam into an accelerated beam of singly ionized heavy ions which are injected into ring 78 and a neutral atom that is trapped out.

The second function of bumping magnet 74 after a ring 78 is loaded to deflect a beam of accelerated particles to a succeeding bumping magnet 82. A plurality of bumping magnets 82 functions in the same way to load a plurality of rings 84. The loading process is under the control of magnet controller 76 so that the rings 78 and 84 are loaded in an order chosen by an operator. Rings 78 and 84 may either be storage rings that keep particles at the energy level to which they have been accelerated before or they may be accelerating rings receiving particles at one energy level and accelerating the particles to a higher level before storing them. In either case, ring controller 86 is connected to each of the rings 78 and 84. Whether or not the rings 78 and 84 serve to accelerate, they will in any case store accelerated particles that are loaded over a period of time. To extract these particles, extraction controller 88 is connected to an extraction magnet 90 in each of the rings 78 and 84. Extraction controller 88 is operated so as to extract accelerated particles from each of the rings 78 and 84 and direct them for essentially simultaneous arrival at a target 92. All of the paths of particles are maintained under a high vacuum under the influence of vacuum system 94. The result of the system of FIGS. 7 and 8 is to direct at target 92 a number of charged particles of high energy arriving from a number of directions in a very short time. Such a flux of particles is intended to achieve an amount of energy transfer in a period of time that reaches the levels necessary to cause controlled thermonuclear fusion of an amount of fusionable material placed at target 92.

The dissociator 20 of FIG. 1 and dissociator 80 of FIGS. 7 and 8 are indicated schematically because means for dissociation are well known. It is necessary only to supply enough energy to overcome the bonding energy of the molecular ions. This may be done with a laser beam, a high electric field, or the like. If the efficiency of dissociation is high enough to produce dissociation of upwards of 95% of the molecular ions, then a simple dissociator will be adequate. If, on the other hand, dissociation efficiency drops much beyond 95%, it will be necessary to recirculate undissociated molecular ions through the dissociator. This is most easily accomplished through a well-known means of a bypass storage ring. In such an application, the dissociator will discharge three types of particles. First, it will produce the dissociated singly ionized heavy ion, singly ionized iodine in the example used here, and the unionized atom that was associated with the heavy ion, here, unionized hydrogen. In addition, undissociated ions will pass through the dissociator. They could be discarded along with the unionized hydrogen, but may also be separated by mass and switched to a bypass storage ring that will circulate them for another trip through the dissociator. The bypass ring may return undissociated ions to the dissociator after one trip around the bypass ring, or it may be constructed with a separate bypass loop to permit recirculating storage of undissociated ions before they are returned to the dissociator. These means are described generally because they are well known to persons skilled in the design and development of particle accelerators.

The only restriction stated thus far on particles to be accelerated is an atomic mass in excess of 100. However, reference has been made to hydrogen iodide and iodine as the molecular ion and atomic ion, respectively. This choice is approrpriate because the relatively large difference between the first and second ionization potentials of hydrogen iodide makes it relatively easy to achieve single ionization of a high percentage of the atoms of hydrogen iodide. This is of value because molecular ions that are ionized to levels other than the unique one chosen for the first acceleration will be lost for further use. The large difference in ionization potentials for hydrogen iodide reduces the probability of ionization to unwanted levels. It should be apparent, though, that this is only one consideration in the selection of ions. Others include the mass and the cross-section for collisions. These represent variables for manipulation by the designer. In principle, any atom or molecule that exceeds 100 atomic mass units can be used to practice this invention.

The embodiments of the invention in which an exclusive property or privilege is claimed are defined as follows:

1. An apparatus for striking a target with a beam of heavy ions having atomic masses greater than 100, the apparatus comprising:
   a. a source of uniquely ionized ions of a mass greater than 100;
   b. means for accelerating the uniquely ionized ions to a high energy;
   c. means for storing the accelerated ions at the energy; and
   d. means for extracting the accelerated ions into a plurality of beams and directing the beams to arrive substantially simultaneously at the target.

2. The apparatus of claim 1 wherein the means for accelerating the uniquely ionized ions comprises a linear accelerator and a synchrotron coupled to the linear accelerator.

3. The apparatus of claim 1 wherein the means for accelerating the uniquely ionized ions comprises a Cockroft-Walton accelerator, a linear accelerator coupled to the Cockroft-Walton accelerator, and a synchrotron coupled to the linear accelerator.

4. The apparatus of claim 2 wherein the means for storing the accelerated ions comprises the synchrotron operated as a storage ring.

5. The apparatus of claim 2 wherein the means for storing the accelerated ions comprises a storage ring coupled to the accelerating means.

6. The apparatus of claim 2 wherein the means for storing the accelerated ions comprises a plurality of storage rings coupled to the accelerating means.

7. The apparatus of claim 6 wherein the means for extracting comprises a plurality of stripping stations, one at each storage ring, and a plurality of extraction ports receiving stripped ions and directing them at the target.

8. The apparatus of claim 5 wherein the means for extracting comprises a plurality of stripping stations in the storage ring and a plurality of extraction ports, one at each stripping station, receiving stripped atoms and directing them at the target.

9. An apparatus for striking a target with a beam of heavy ions having atomic masses greater than 100, the apparatus comprising:
   a. a source of uniquely ionized molecular ions of a mass greater than 100;
   b. means for accelerating the uniquely ionized molecular ions to a high energy;
   c. a storage ring for storing the accelerated molecular ions at the energy;
   d. means for dissociating the accelerated molecular ions to produce uniquely ionized accelerated atomic ions having an atomic mass greater than 100 at the energy;
   e. a storage ring for storing the atomic ions at the energy;
   f. a single stripping station for stripping the atomic ions to form a stripped beam;

g. means for bending the stripped beam to extract the stripped beam;

h. a beam switch yard; and i. control means for switching the stripped, extracted beam to a plurality of beams in a time sequence predetermined to direct the plurality of beams at the target at substantially the same time.

10. An apparatus for striking a target with a beam of heavy ions having atomic masses grater than 100, the apparatus comprising:

a. source of uniquely ionized molecular ions of a mass greater than 100;

b. means for accelerating the uniquely ionized molecular ions to a high energy;

c. a plurality of storage rings for storing the accelerated molecular ions at the energy;

d. means for dissociating the accelerated molecular ions to produce uniquely ionized accelerated atomic ions having an atomic mass greater than 100 at the energy;

e. means for storing the atomic ions at the energy;

f. a plurality of stripping stations for stripping the atomic ions, one of the stations at each of the plurality of storage rings; and g. a plurality of extraction ports receiving the stripped extracted beams at substantially the same time to direct the beams at the target.

11. An apparatus for striking a target with a beam of heavy ions having atomic masses greater than 100, the apparatus comprising:

a. a source of uniquely ionized molecular ions of a mass greater than 100;

b. means for accelerating the uniquely ionized molecular ions to a high energy;

c. a storage ring for storing the accelerated molecular ions at the energy;

d. means for dissociating the accelerated molecular ions to produce uniquely ionized accelerated atomic ions having an atomic mass greater than 100 at the energy;

e. means for storing the atomic ions at the energy;

f. a plurality of stripping stations in the storage ring for stripping the atomic ions;

g. a plurality of ports, one for each stripping station, for extracting the stripped atomic ions; and h. means for controlling the beam such that all the stripping stations are operated simultaneously to strip the atomic ions to deflect the ions into the plurality of ports, which ports are directed at the target.

* * * * *